April 12, 1927.
L. C. DE CAMP ET AL
1,624,779
MEASURING TAPE
Filed Oct. 6, 1924
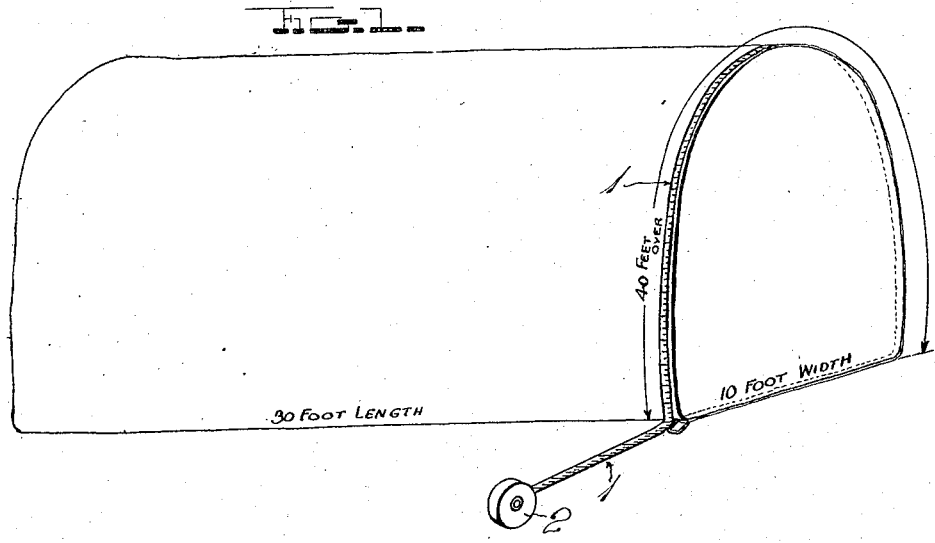
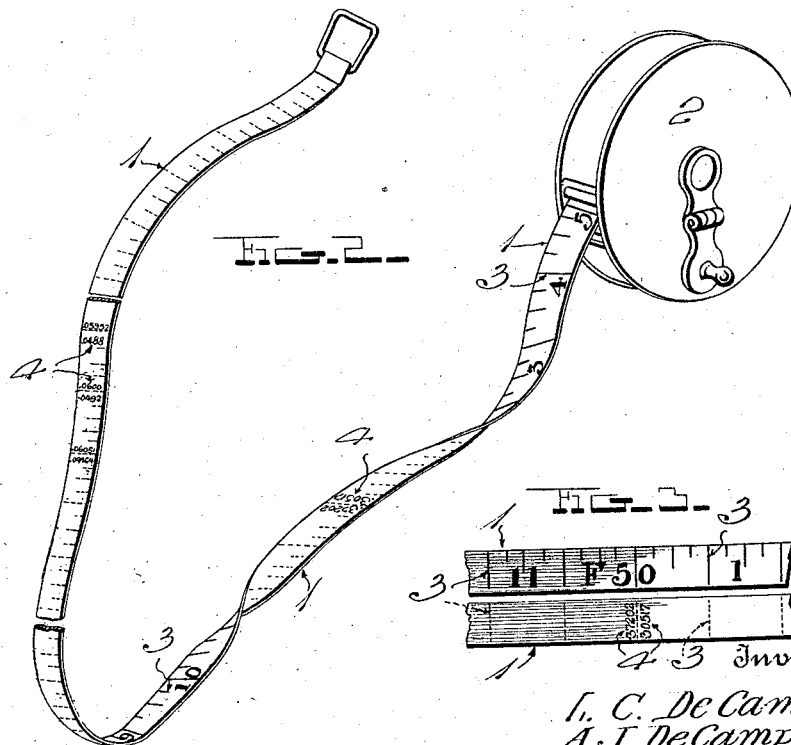
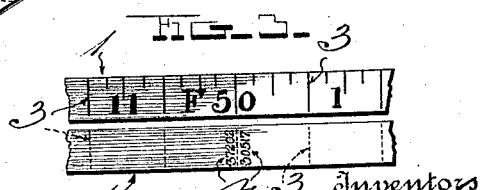
Inventors
L. C. De Camp
A. J. De Camp Patented Apr. 12, 1927.

1,624,779

UNITED STATES PATENT OFFICE.

LOUIS C. DE CAMP AND ALFRED J. DE CAMP, OF MOLINA, COLORADO.

MEASURING TAPE.

Application filed October 6, 1924. Serial No. 742,031.

In estimating the number of tons in hay stacks of different sizes, a great deal of computing and the expenditure of quite an amount of time, is now necessary, but it is the object of our invention to provide an improved form of tape line for measuring the transverse perimeter of the stack, said line having numbers corresponding to the perimeters of different stacks for disclosing the approximate tonnage of hay in a "slice" cut transversely through the stack and of predetermined thickness, preferably one foot. Thus, by measuring the transverse perimeter of a stack, glancing at the proper number on the tape and merely multiplying such number by the number of feet in the stack, its approximate tonnage may be obtained.

A further object is to provide a measuring tape in which the numbers above referred to and units of linear measurement are placed on the same tape, so that after measuring the transverse perimeter of the stack with said tape and obtaining the proper reading, the length of the stack may be measured with the same tape, permitting the remainder of the estimation to be easily performed.

With the foregoing in view, the invention resides in the novel subject matter hereinafter described and claimed, the description being supplemented by the accompanying drawing.

Figure 1 is a diagrammatic perspective view showing the manner of measuring the transverse perimeter of a hay stack.

Figure 2 is a perspective view of the tape line, partly broken away, certain of the tonnage representing numbers being omitted.

Figure 3 is a view showing the opposite sides of a portion of the tape.

In the drawing above briefly described, the numeral 1 designates a tape line which is preferably wound normally in the well known casing 2. One side of this tape line, in the present disclosure, is provided with units of linear measurement as indicated by the numeral 3, the line being preferably divided into feet and inches. The line may be used for measuring the transverse perimeter of any hay stack, as indicated in Fig. 1, and for measuring the length of said stack. The line 1 is provided on its reverse side, with numbers 4 showing the approximate weight of a predetermined transverse "slice" of any of the plurality of different sized stacks, the weight disclosing number for any "slice" being opposite the measurement showing the transverse perimeter of the stack containing such "slice." For instance, if the transverse perimeter of the stack, measured as indicated in Fig. 1, or in an equivalent manner is 50 feet, the reverse side of the tape is inspected and a number will be found giving the approximate weight of a predetermined transverse "slice" through the stack, such "slice" being preferably one foot thick. Then, it is simply necessary to multiply this number by the number of feet in the length of the stack, to approximate the tonnage contained in the entire stack. Preferably, the tape line is provided with one set of numbers showing the approximate weight for alfalfa hay and with another set of numbers showing the approximate weight for other hay.

It is an easy matter to properly arrange the numbers 4 so as to give the approximate weights required. For instance, the average weight of say five-hundred cubic feet of timothy, clover or analogous hay, may readily be determined, and this number will be printed on the tape opposite the point thereon which, when co-acting with the free end of the tape, would extend around the perimeter of an imaginary slice one foot thick and containing approximately five-hundred cubic feet of hay. The other numbers may be determined in a like manner and placed at the proper points along the tape. As the average weight of a quantity of alfalfa hay is different from the average weight of other kinds of hay, different numbers are of course necessary on the tape for determining alfalfa weight.

It will be seen from the foregoing that the invention is simple and inexpensive, yet that it will be highly efficient and desirable for estimating the tonnage in different sizes of hay stacks, without the necessity of consuming a great deal of time or calculating as much as is now necessary.

We claim:

A hay-stack measuring device comprising a tape line adapted to be passed transversely over an elongated hay-stack and transversely along the ground at one end of the stack, said tape having spaced pairs of numbers at or near one pair of which, the free end of the tape will be located when said tape is positioned as above stated, the numbers reached by said free end of the tape showing two approximate weights of an imaginary slice one foot thick cut transversely from the stack being measured, one weight being that of one kind of hay while the other is that of another kind, said tape also being divided into feet, whereby after determining the weight of the aforesaid imaginary slice one foot thick, the length of the stack in feet may be measured with the tape, multiplication of said weight by the number of feet of stack length, giving the approximate weight of the entire stack.

In testimony whereof we have hereunto affixed our signatures.

LOUIS C. DE CAMP.
ALFRED J. DE CAMP.